United States Patent
Yang et al.

(10) Patent No.: US 6,211,786 B1
(45) Date of Patent: Apr. 3, 2001

(54) BATTERY-FREE CIRCUIT DEVICE FOR RF IDENTIFYING TAG

(75) Inventors: Jeng-Rern Yang, Tao Yuan; Tsung-Han Yang, Hsinchu, both of (TW)

(73) Assignee: Holtek Semiconductor Inc.

( * ) Notice: Subject to any disclaimer, the term of this patent is extended or adjusted under 35 U.S.C. 154(b) by 0 days.

(21) Appl. No.: 09/418,440

(22) Filed: Oct. 18, 1999

(30) Foreign Application Priority Data

Apr. 30, 1999 (TW) .................................. 88106984

(51) Int. Cl.[7] .................................................. G08B 23/00
(52) U.S. Cl. ..................................... 340/572.5; 340/572.1; 340/572.2; 340/572.4; 340/572.6
(58) Field of Search ............................. 340/572.5, 572.1, 340/572.2, 572.4, 572.6, 10; 342/50, 51; 455/75, 82

(56) References Cited

U.S. PATENT DOCUMENTS

| | | | |
|---|---|---|---|
| 4,514,731 | * 4/1985 | Falck et al. | 340/825.08 |
| 4,739,328 | * 4/1988 | Koelle et al. | 342/44 |
| 5,053,774 | 10/1991 | Schuermann et al. | 342/44 |
| 5,126,745 | 6/1992 | Steinhagen et al. | 342/51 |
| 5,227,740 | 7/1993 | Steinhagen et al. | 331/166 |
| 5,281,855 | 1/1994 | Hadden et al. | 257/784 |
| 5,347,280 | * 9/1994 | Schuermann | 342/42 |
| 5,517,194 | * 5/1996 | Carroll et al. | 342/50 |
| 5,608,406 | * 3/1997 | Eberth et al. | 342/51 |
| 5,838,235 | * 11/1998 | Thorigne | 340/572 |

OTHER PUBLICATIONS

Kaiser, Ulrich and Steinhager, Wolfgang, A Low Power Transponder IC for High Performance Identification Systems, IEEE Journal of Solid–State Circuits, vol. 30, No. 3, Mar 1995.

* cited by examiner

Primary Examiner—Jeffrey A. Hofsass
Assistant Examiner—Tai T. Nguyen (57) ABSTRACT

This invention relates to a battery-free circuit device for RF identifying tag. It is advantageous that the electric potential across the antenna coil induced by the change of the alternating magnetic field of the radio wave signals is independent of the modulational switching of the RF identifying tag during the positive half cycles when the antenna is receiving the radio wave signals from the card reader, and that the efficiency of the voltage-charging rectifier circuit remains constant when the data are delivered into the card reader. Furthermore, in this invention, the modulational amplitude of the signals is larger than that in the prior art, thus the propagating distance is longer and it shows better accuracy and reliability in data reading.

15 Claims, 4 Drawing Sheets

BATTERY-FREE CIRCUIT DEVICE FOR RF IDENTIFYING TAG

FIELD OF THE INVENTION

This invention relates generally to a battery-free circuit device for RF identifying tag, and more specifically, to a battery-free circuit device for RF identifying tag that has advantages such as a longer identifying distance with better data reading accuracy and reliability than in the prior art.

BACKGROUND OF THE INVENTION

The products related to the RF identifying system in the related art have been utilized in guarded entrance systems, time card systems, inventory systems, delivery management systems, and animal identification systems. Recently, RF identifying technique has further been widely used in car key recognition and RF bar codes of the merchandise. Accordingly, it has great potential in commercial applications. However, the generation of the conventional RF identifying tag now in use is owing to the corresponding pattern of binary 1's and 0's in a data source that represent the variation of the load impedance of the controlling antenna. The efficiency of voltage-charging rectifying of the received RF electro-magnetic waves traveling through the dc source strongly depends on the fact whether the impedance of the semiconductor device and the read-only memory (ROM) substantially matches the load impedance of the antenna or not. In addition, the card reader can only accurately detect the variation of the load impedance in a distance shorter than ten centimeters (10 cm), it is thus very inconvenient as far as the operation of the users is concerned.

Figure 1:
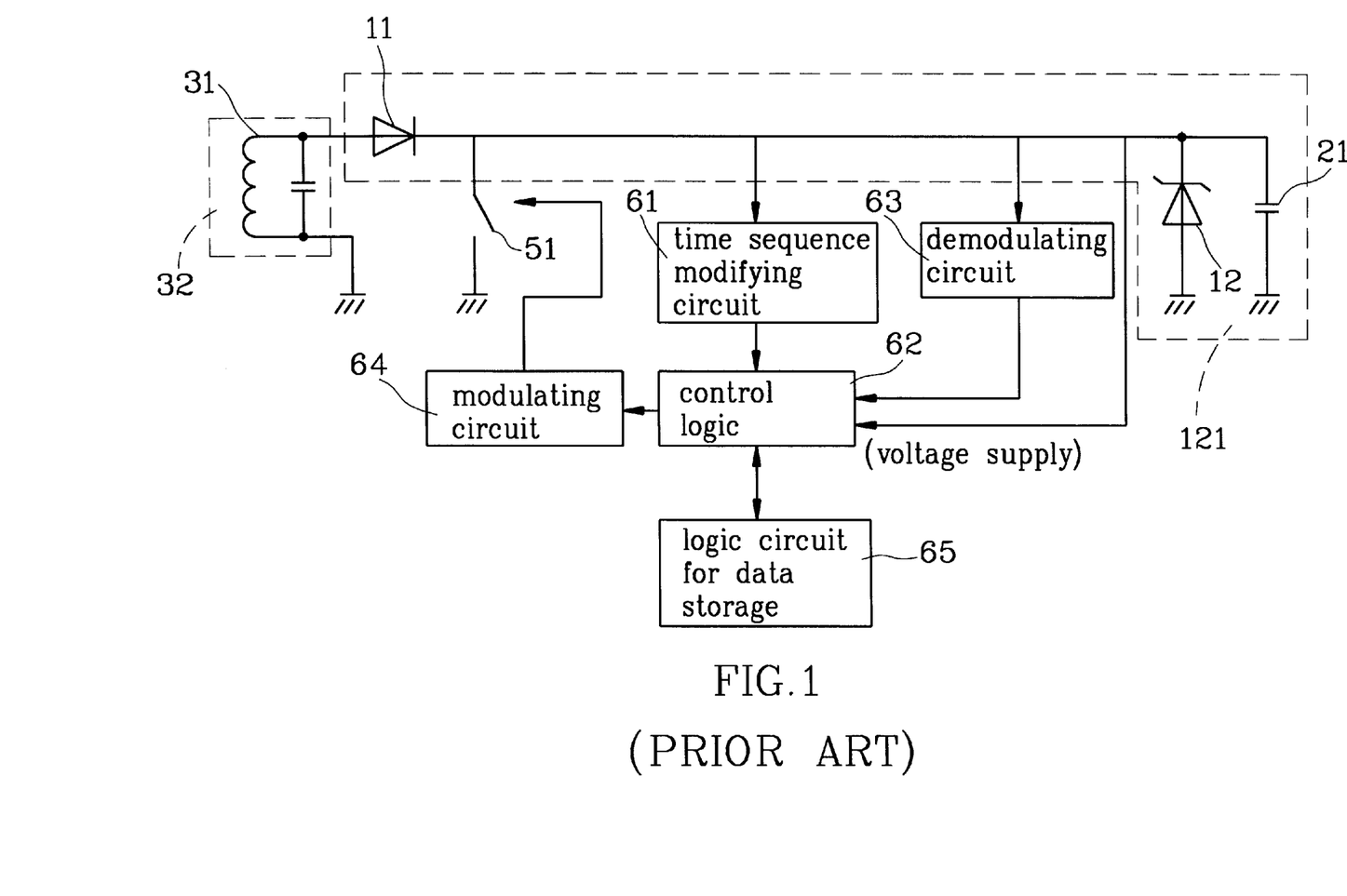
FIG. 1 is a somewhat schematic diagram illustrating a circuit device for RF identifying tag according to the prior art.

Please refer to FIG. 1 for description of the prior art. FIG. 1 is a somewhat schematic diagram illustrating a system of the conventional RF identifying technique. The schematic diagram in FIG. 1 is related to a resonator 32 that comprises an antenna 31 and is connected to a voltage-charging rectifier circuit 121. The voltage-charging rectifier circuit 121 is connected to a control logic 62 that is connected to a logic circuit for data storage 65. In the meantime, the voltage-charging rectifier circuit 121 is also connected to a time sequence modifying circuit 61 and a modulating circuit 64. The mentioned voltage-charging rectifier circuit 121 is composed of a rectifier diode 11 which is serially connected with a voltage limiter 12 and a capacitor 21. The mentioned voltage limiter 12 is a zener diode. Furthermore, the control logic 62 is connected to a demodulating circuit 63. The circuit device of the conventional RF identifying tag is thus completed.

As mentioned above, within the reading range of the card reader (not shown in the figure), generally ten centimeters, the antenna 31 in the circuit diagram of the RF identifying tag receives the RF signals $f_0$ from the card reader, and the capacitor 21 is charged by the voltage-charging rectifier circuit 121 to the voltage level of a zener diode (used here as a voltage limiter 12) and play the role as a voltage supply $V_{cc}$ which provide the power supply for the entire system of the RF identifying tag. In the meantime, the time sequence modifying circuit 61 amplifies the received RF signals $f_0$, and the received RF signals are then converted into time sequence modified signals with digital level and provide the time sequence modified signals for the entire system of the RF identifying tag.

Furthermore, the digital data from a register or a memory (not shown in the figure) are delivered by the logic circuit for data storage 65 into the modulating circuit 64 in accordance with the time sequence modified signals, and then are emitted from the antenna 31 into a card reader. The signals introduced from the card reader into the RF identifying tag are modulated RF signals received by the antenna 31 in the circuit device and then delivered into the demodulating circuit 63. The control logic 62 controls the operation of the whole circuit device for the RF identifying tag.

Referring to the prior art of RF identifying techniques, for example, in the system disclosed and claimed in the U.S. Pat. No. 4,786,907 entitled "Transponder Useful In A System For Identifying Objects" filed by Alfred R. Koelle on Nov. 22, 1988, when the modulated signals are emitted from an antenna, the signals directly control a switch and thus control the load impedance of the antenna. The technique is somewhat identical to the technique in the previously discussed conventional circuit device for RF identifying tag (as show in FIG. 1) in which the card reader can read the corresponding pattern of binary 1's and 0's in a data source in accordance with the magnitude variation of the electro-magnetic field due to the change in the load impedance of the antenna.

However, the system in the prior art has had certain drawbacks, mainly because the amplitude of the electric potential over the antenna coil induced by the change of the alternating magnetic field of the radio wave signals strongly depends on the fact whether the impedance of the semiconductor device and the read-only memory (ROM) substantially matches the load impedance of the antenna or not. Therefore, when the modulator of the identifying tag delivers the data, the switching on or switching off of the control switch 51 can cause the variation of the impedance and thus reduce the voltage-charging efficiency of the voltage-charging rectifier circuit 121; When the switch 51 is on, the positive terminal of the capacitor 21 is directly connected to the load of low impedance. Furthermore, the input signals of the time sequence modifying circuit 61 are converted to output signals of unstable amplitude also due to the switching on or switching off of the switch 51, and thus the designing complexity of the time sequence modifying circuit 61 increases. In addition, the change in load impedance due to the state changing of the control switch 51 only brings forth minimal variation in electromagnetic field, thus it is not easy for the card reader to detect the minimal variation. As a result, the method of using the control switch 51 to cause the change in load impedance for data delivery can only be used within a short distance, for instance, less than ten centimeters. Therefore, it is inconvenient for applications and suffers low accuracy.

Consequently, in order to overcome the discussed problems, the present invention provides a battery-free circuit device for RF identifying tag that has advantages such as a longer identifying distance and a larger detecting angle with better data reading accuracy and reliability than in the prior art.

BRIEF DESCRIPTION OF THE INVENTION

This invention relates to a battery-free circuit device for RF identifying tag. It can be especially be used in car key recognition, RF bar codes of the merchandise, guarded entrance systems, time card systems, inventory systems, delivery management systems, and animal identification systems. Owing to the half-wave rectifying charging of the signals from high frequency end of the antenna to the ground, a steady direct voltage source is obtained, and the time sequence modified signals of the system generated by the time sequence modifying circuit at the high frequency end are independent of the modulated signals.

Accordingly, it is one object of the present invention to provide a battery-free circuit device for RF identifying tag that has better data reading accuracy than in the prior art.

In addition, it is another object of the present invention to provide a battery-free circuit device for RF identifying tag that has a longer identifying distance and a larger detecting angle than in the prior art.

Furthermore, it is still another object of the present invention to provide a battery-free circuit device for RF identifying tag that has higher charging efficiency and better reliability of the circuit than in the prior art.

To accomplish the foregoing objects, the present invention provides a battery-free circuit device for RF identifying tag with an antenna with two terminals. Each terminal is serially connected to two diodes of different polarities respectively. At the other terminals of the diodes, the two diodes are also connected to the positive terminal of the capacitor and the ground, respectively. The positive terminal of one diode is connected in parallel with a reversed diode of which the other terminal is connected to the ground, and the negative terminal of the other diode is connected in parallel with a switch which is controlled by the modulated signals.

The present invention is advantageous that the electric potential across the antenna coil induced by the change of the alternating magnetic field of the radio wave signals is independent of the modulational switching of the RF identifying tag during the positive half cycles when the antenna is receiving the radio wave signals from the card reader, and that the efficiency of the voltage-charging rectifier circuit remains constant when the data are delivered into the card reader. Further, the time sequence modified signals amplified during the positive half cycles are not distorted by the modulated signals. And owing to the larger signal modulational amplitude because the delivery of the modulated data is controlled by the voltage across the two terminals of the antenna during the negative half cycles, the propagating distance is longer than that in the prior art.

Hereinafter, preferred embodiment of the present invention relates to a circuit device comprising a resonator including an antenna which can resonate the signals received by the antenna. The resonator is connected to a voltage-charging rectifier circuit. The voltage-charging rectifier circuit is composed of a rectifier diode which is serially connected with the antenna of the resonator and can rectify the signals received by the antenna. The resonator is also connected at the other terminal to a signal process circuit which is used to modulate the RF emitting signals or demodulate the received signals and is also used to generate time sequence modified signals of the system by the received signals.

Moreover, the embodiment of the present invention relates to a circuit device also comprising a control computational circuit which is connected to the voltage-charging rectifier circuit and the signal process circuit which is used to computationally control the modified wave form signals and is also used to control the operation of the whole battery-free circuit device for RF identifying tag; a frequency divider which is connected to the output of the signal process circuit the control computational circuit and is used to divide the frequency of the time sequence modified signal, under the control of the control computational circuit; a shift register which is connected to the frequency divider and the control computational circuit and is used to load the signals that are then returned to the signal process circuit and finally emitted from the antenna; and also an RF amplitude limiter which is, at one terminal, connected to the voltage-charging rectifier circuit and, at the other terminals, connected to the resonator and is used to limit the alternating amplitude and increase the efficiency of voltage-charging rectifying of the RF signals received by the antenna.

Furthermore, the embodiment of the present invention relates to a circuit device also comprising a modulational switch which is connected to the resonator at one terminal and connected to the ground at the other terminal and its on or off state is determined by the signal process circuit.

BRIEF DESCRIPTION OF THE DRAWINGS

The object, spirit and advantages of the present invention will be readily understood by the accompanying drawings and detailed descriptions.

DETAIL DESCRIPTION OF THE INVENTION

Hereinafter, preferred embodiment of the present invention will be described in detail with reference to the accompanying drawings.

The present invention relates to a battery-free circuit device for RF identifying tag, and more particularly, to a battery-free circuit device for RF identifying tag that has an antenna with two terminals. Each terminal is serially connected to two diodes of different polarities respectively. At the other terminals of the diodes, the two diodes are also connected to the positive terminal of the capacitor and the ground, respectively. The positive terminal of one diode is connected in parallel with a reversed diode of which the other terminal is connected to the ground, and the negative terminal of the other diode is connected in parallel with a switch which is controlled by the modulated signals. The operation of the battery-free circuit device for RF identifying tag according to the embodiment of the present invention is based on the fact that the electric potential across the antenna coil induced by the change of the alternating magnetic field of the radio wave signals is independent of the modulational switching of the RF identifying tag during the positive half cycles when the antenna is receiving the radio wave signals from the card reader, and that the efficiency of the voltage-charging rectifier circuit remains constant when the data are delivered into the card reader. Further, the time sequence modified signals amplified during the positive half cycles are not distorted by the modulated signals. And owing to the larger signal modulational amplitude because the delivery of the modulated signals of the RF identifying tag is controlled by the voltage across the two terminals of the antenna during the negative half cycles, the propagating distance is longer than that in the prior art.

Figure 2:
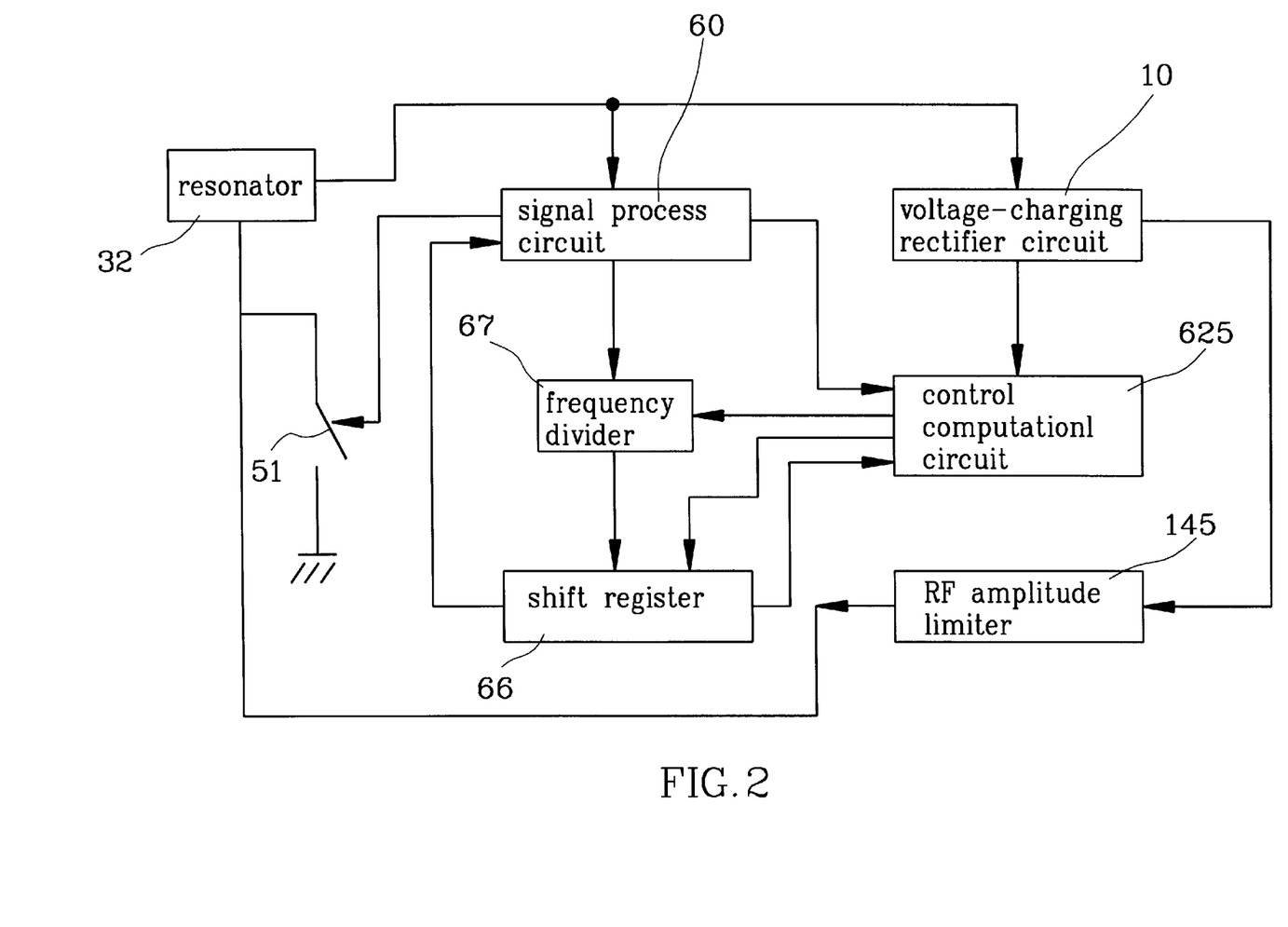
FIG. 2 is a somewhat schematic diagram illustrating a circuit device for RF identifying tag according to the embodiment of the present invention.

First of all, please refer to FIG. 2 for detailed description of the main structure of the present invention. FIG. 2 is a somewhat schematic diagram illustrating a main structure of the circuit device for RF identifying tag according to the embodiment of the present invention. The schematic diagram in FIG. 2 is related to a resonator 32 that comprises an antenna 31 (not shown in FIG. 2, but shown in FIG. 3 which will be later discussed) which can resonate the signals received by the antenna 31. The resonator 32 is connected to a voltage-charging rectifier circuit 10. The voltage-charging rectifier circuit 10 is composed of a rectifier diode 11 (shown in FIG. 3 which will be later discussed) which is serially connected with the antenna 31 of the resonator 32 and can rectify the signals received by the antenna 31. The resonator 32 is also connected at the other terminal to a signal process circuit 60 which is used to modulate the RF emitting signals or demodulate the received signals and is also used to generate time sequence modified signals of the system by the received signals.

Moreover, as shown in FIG. 2, the embodiment of the present invention relates to a circuit device also comprising a control computational circuit 625 which is connected to the voltage-charging rectifier circuit 10 and the signal process circuit 60 and is used to computationally control the modified wave form signals and is also used to control the operation of the whole battery-free circuit device for RF identifying tag; a frequency divider 67 which is connected to the output of the signal process circuit 60 and the control computational circuit 625 and is used to divide the frequency of the time sequence modified signal, under the control of the control computational circuit 625; a shift register 66 which is connected to the frequency divider 67 and the control computational circuit 625 and is used to load the signals that are then returned to the signal process circuit 60 and finally emitted from the antenna 31; and also an RF amplitude limiter 145 which is, at one terminal, connected to the voltage-charging rectifier circuit 10 and, at the other terminals, connected to the resonator 32 and is used to limit the alternating amplitude and increase the efficiency of voltage-charging rectifying of the RF signals received by the antenna 31.

Furthermore, as shown in FIG. 2, the embodiment of the present invention relates to a circuit device also comprising a modulational switch 51 which is connected to the resonator 32 at one terminal and connected to the ground at the other terminal and its on or off state is determined by the signal process circuit 60.

Figure 3:
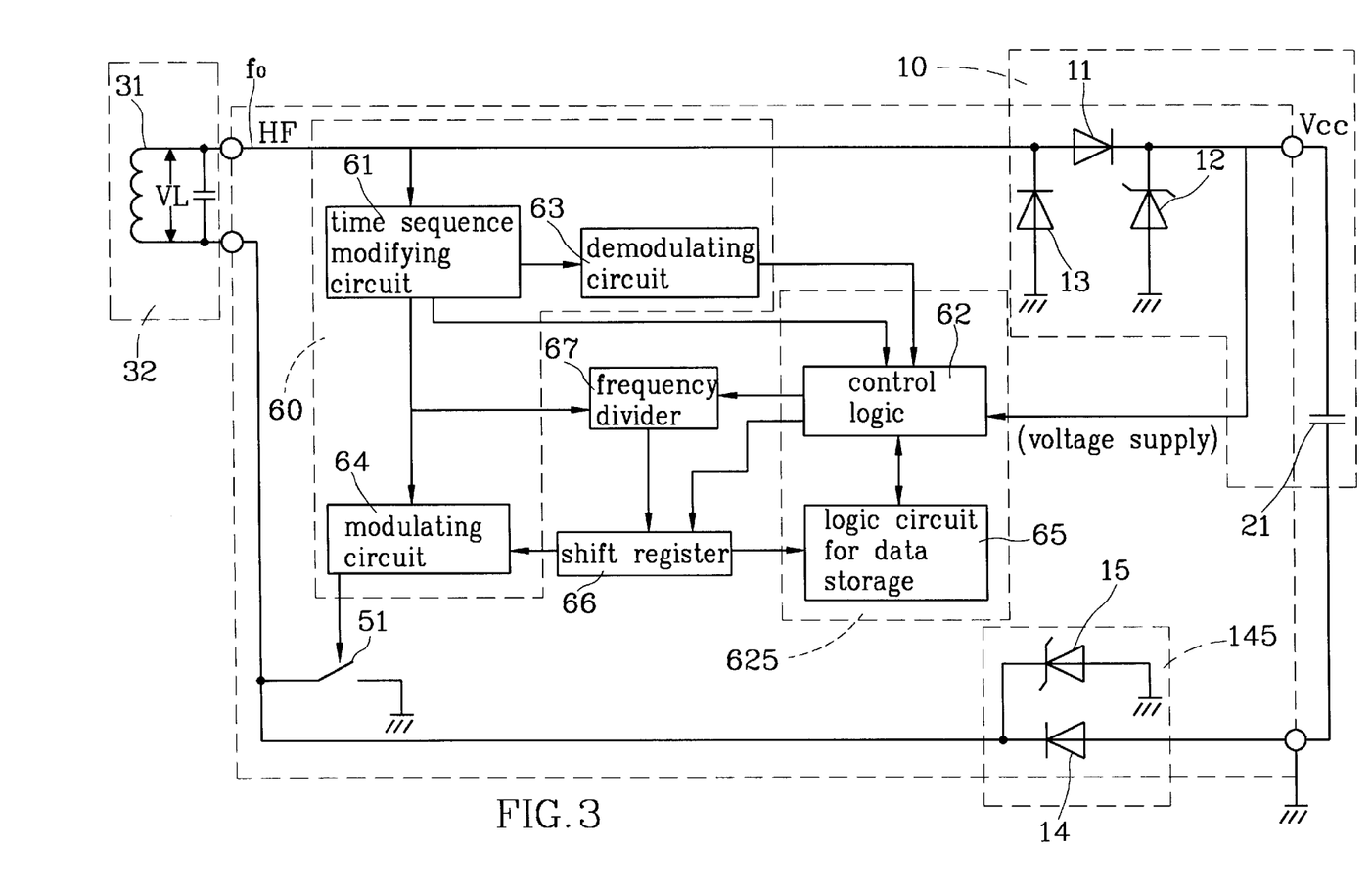
FIG. 3 is a more detailed schematic diagram than FIG. 2 illustrating a circuit device for RF identifying tag according to the embodiment of the present invention.

In order to give a more detailed description about the battery-free circuit device for RF identifying tag according to the embodiment of the present invention, FIG. 3 is referred to describe the circuit diagram as shown in FIG. 2. FIG. 3 is a more detailed schematic diagram than FIG. 2 illustrating a circuit device for RF identifying tag according to the embodiment of the present invention. Wherein, the resonator 32 comprises an antenna 31 connected in parallel with a capacitor (not shown in the figure) to complete a resonating circuit which can resonate the signals.

As shown in FIG. 3, the signal process circuit 60 comprises a time sequence modifying circuit 61. The input of the time sequence modifying circuit 61 is also the input of the signal process circuit 60, and is connected to one terminal of the resonator 32. The signal process circuit 60 can amplify the RF signals f0 received by the resonator 32, the received RF signals are then converted to time sequence modified signals with digital level and provide the time sequence modified signals for the entire system of the RF identifying tag, and are independent of the modulational signals. One output of the time sequence modifying circuit 61 is connected to the control computational circuit 625 and provide the control computational circuit 625 with the signals of clock pulses. The signal process circuit 60 also comprises a demodulating circuit 63 which is connected to one of the outputs of the time sequence modifying circuit 61 and is used to demodulate the amplified and modified the RF signals received by the antenna 31 and then deliver the signals into the control computational circuit 625. Furthermore, the signal process circuit 60 comprises a modulating circuit 64 which is connected to one of the outputs of the time sequence modifying circuit 61 and the shift register 66 and is used to modulate the signals that are going to be emitted, and the modulated signals are transmitted through the antenna 31 of the resonator 32.

As for the internal circuit elements of the discussed control computational circuit 625, it comprises a control logic 62 which has two inputs connected to the output of the signal process circuit 60 and the output of the voltage-charging rectifier circuit 10 respectively. Wherein, the connection with the output of the voltage-charging rectifier circuit 10 plays the role of a power supply. The control logic 62 receives the signals which have been received by the antenna 31 and then amplified and modified to be digital signals of clock pulses and then demodulated and transmitted by the demodulating circuit 63. The control logic 62 is in charge of the operation of logic computation, in other words, it controls the operation of the whole circuit device for RF identifying tag. The control computational circuit 625 also comprises a logic circuit for data storage 65. The logic circuit for data storage 65 is connected to the control logic 62 and is used to store the digital data which have been logically calculated. The logic circuit for data storage 65 is also connected to the shift register 66 and is used to store the processed digital signals.

Referring to FIG. 3, the voltage-charging rectifier circuit 10 according to the embodiment of present invention comprises two diodes 11, 13. Wherein, the p-terminal of the first diode 11 is connected to the n-terminal of the second diode 13, while the p-terminal of the second diode 13 is connected to the ground, namely, a grounded diode. The n-terminal of the first diode 11 is connected to a voltage limiter 12 connected in parallel with a capacitor 21. The voltage limiter 12 utilizes a zener diode, and acts as a dc voltage limiter for the whole voltage-charging rectifier circuit 10. The capacitor 21 is connected to the ground, and thus the voltage-charging rectifier circuit 10 is completed. In addition, as shown in FIG. 3, the RF amplitude limiter 145 is composed of an alternating amplitude limiter 15 connected in parallel with a diode 14. The alternating amplitude limiter 15 utilizes a zener diode, and is used to limit the alternating signals.

Regarded as the main characteristic of this invention, the two ends of the antenna 31 are serially connected to two diodes 11, 14 of different polarities respectively. At the other terminals of the diodes, the two diodes 11, 14 are also connected to the positive terminal of the capacitor 21 and the ground, respectively. The positive terminal (p-terminal) of the first diode 11 is connected in parallel with the reversed diode 13 of which the other terminal is connected to the ground, and the negative terminal (n-terminal) of the second rectifying diode 14 is connected in parallel with a switch 51 which is controlled by the modulated signals. In this manner, the electric potential across the antenna coil induced by the change of the alternating magnetic field of the radio wave signals is independent of the modulational switching of the RF identifying tag during the positive half cycles when the antenna is receiving the radio wave signals from the card reader, and that the efficiency of the voltage-charging rectifier circuit remains constant when the data are delivered into the card reader.

Figure 4:
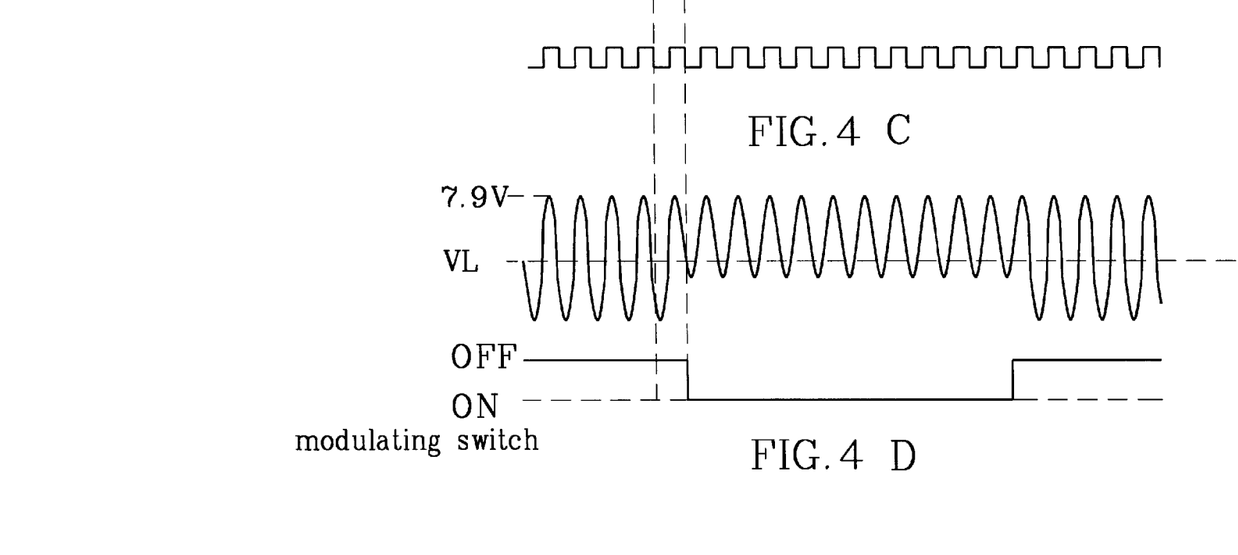
FIG. 4A is a timing diagram illustrating the clock pulses of the signal response at the high frequency end of the antenna to the ground according to the embodiment of the present invention.
FIG. 4B is a schematic diagram illustrating the waveform of a direct voltage source with a steady efficiency obtained by half wave rectifying charging at the high frequency end of the antenna according to the embodiment of the present invention.
FIG. 4C is a schematic diagram illustrating the waveform indicating that the time sequence of the system generated from the time sequence modifying circuit is not distorted by the modulated signals according to the embodiment of the present invention.
FIG. 4D is a schematic diagram illustrating the waveform of the voltage VL across the two terminals of the antenna coil, wherein the voltage is only oppressed when the switch is switched on to the ground during the negative half cycles according to the embodiment of the present invention.

In order to explain the very advantage this invention can bring forth, FIG. 4 shows the related wave forms: to begin with, when the RF signals transmitted by the card reader are received by the antenna 31 of the identifying system, at the high frequency end of the antenna 31, the signal response has the wave form as shown in FIG. 4A. FIG. 4A is a timing diagram illustrating the clock pulses of the signal response at the high frequency end of the antenna 31 to the ground according to the embodiment of the present invention. No matter the modulational switch 51 is controlled by the modulated signals to be switched on or off, it does not have any effect upon the signals at the high frequency end of the antenna 31. Therefore, a direct voltage source with a steady efficiency can be obtained by half wave rectifying charging at the high frequency end of the antenna, and plays the role as a voltage supply $V_{cc}$ which provide the power supply for the entire system of the RF identifying tag. FIG. 4B is a schematic diagram illustrating the waveform of a direct voltage source with a steady efficiency obtained by half wave rectifying charging at the high frequency end of the antenna according to the embodiment of the present invention.

In addition, at the high frequency end, the time sequence modifying circuit 61 amplifies the received RF signals $f_0$, and the received RF signals are then converted into time sequence modified signals with digital level and provide the time sequence modified signals for the entire system of the RF identifying tag. Such process is also independent of the modulated signals. FIG. 4C is a schematic diagram illustrating the waveform indicating that the time sequence of the system generated from the time sequence modifying circuit is not distorted by the modulated signals according to the embodiment of the present invention. Furthermore, the shift register 66, the frequency divider 67 and the logic circuit for data storage 65 deliver the data from a register or a memory into modulating circuit 64 and modulational switch 51 in accordance with the time sequence of the system. Finally, the antenna 31 emits the RF signals that are later received by the card reader. The signals introduced from the card reader into the RF identifying tag are modulated RF signals received by the antenna 31 in the circuit device and then delivered into the demodulating circuit 63. The control logic 62 controls the operation of the whole circuit device for the RF identifying tag.

The voltage VL across the two terminals of the antenna 31 coil is as shown in FIG. 4D. FIG. 4D is a schematic diagram illustrating the waveform of the voltage VL across the two terminals of the antenna coil, wherein the voltage is only oppressed when the modulational switch 51 is switched on to the ground during the negative half cycles according to the embodiment of the present invention. Consequently, in this invention, the delivery of the modulated data is controlled by the voltage across the two terminals of the antenna during the negative half cycles. In other words, the circuit device in this invention utilizes the negative half cycles to transmit the signals, and the positive half cycles to execute the voltage-charging rectifying and generate the time sequence modified signals. The switching on or off of the modulational switch 51 only influences the signals during the negative half cycles, but not during the positive half cycles, thus the voltage-charging rectifying efficiency and the time sequence modified signals can stay independence of the modulated signals. Since the modulational switch 51 can increase the voltage across the antenna during the negative half cycles, the propagating distance in this invention is longer than that in the prior art.

As discussed above, this invention relates to a battery-free circuit device for RF identifying tag. The efforts have been made to overcome the problems inherent in the prior art, such as shorter identifying distance, poorer accuracy and reliability. By using the circuit device proposed in this invention, the products related to the to the RF identifying system will have better performance.

Although this invention has been disclosed and illustrated with reference to particular embodiments, the principles involved are susceptible for use in numerous other embodiments which will be apparent to persons skilled in the art. This invention is, therefore, to be limited only as indicated by the scope of the appended claims.

What is claimed is:

1. A battery-free circuit device for RF identifying tag comprising:

a signal process circuit having an output, the signal process circuit providing time sequence modified signals;

a resonator that includes an antenna which resonates the signals received by the antenna, a voltage-charging rectifier circuit which is coupled to the resonator and is used to rectify the signals received by the antenna, a control computational circuit which is coupled to the voltage-charging rectifier circuit and the signal process circuit and is used to computationally control the modified wave form signals and is also used to control the operation of the battery-free circuit device for RF identifying tag, a frequency divider which is connected to the output of the signal process circuit and the control computational circuit and is used to divide the frequency of the time sequence modified signal, under the control of the control computational circuit, a shift register which is connected to the frequency divider and the control computational circuit and is used to load the signals that are then returned to the signal process circuit and finally emitted from the antenna;

a capacitor that is coupled to ground;

a voltage limiter that is connected in parallel with the capacitor; and wherein the voltage-charging rectifier circuit includes two diodes, with the p-terminal of a first diode coupled to the n-terminal of a second diode, with the p-terminal of the second diode coupled to ground, and with the n-terminal of the first diode coupled to the voltage limiter.

2. The battery-free circuit device for RF identifying tag of claim 1, wherein the resonator comprises an antenna connected in parallel with a capacitor to complete a resonating circuit which can resonate the signals.

3. The battery-free circuit device for RF identifying tag of claim 1, wherein the signal process circuit comprises a time sequence modifying circuit, wherein the input is also the input of the signal process circuit and is connected to one terminal of the resonator, and is used to amplify the RF signals received by the resonator which are then converted into time sequence modified signals with digital level and provide the time sequence modified signals for the entire system of the RF identifying tag and are independent of the modulated signals; one output of the time sequence modifying circuit is connected to the control computational circuit and provide the control computational circuit with the signals of clock pulses, a demodulating circuit which is connected to one of the outputs of the time sequence modifying circuit and is used to demodulate the amplified and modified the RF signals received by the antenna and then deliver the signals into the control computational circuit, a modulating circuit which is connected to one of the outputs of the time sequence modifying circuit and the shift register and is used to modulate the signals that are going to be emitted, and the modulated signals are transmitted through the antenna of the resonator.

4. The battery-free circuit device for RF identifying tag of claim 1, wherein the control computational circuit comprises a control logic which has two inputs connected to the output of the signal process circuit and the output of the voltage-charging rectifier circuit respectively and receives the signals which have been received by the antenna and then amplified and modified to be digital signals of clock pulses and then demodulated and transmitted by the demodulating circuit, and is in charge of the operation of logic computation, a logic circuit for data storage which is connected to the control logic and is used to store the digital data which have been logically calculated, and is also connected to the shift register and is used to store the processed digital signals.

5. The battery-free circuit device for RF identifying tag of claim 1, wherein the voltage limiter utilizes a zener diode, and acts as a dc voltage limiter for the voltage-charging rectifier circuit.

6. The battery-free circuit device for RF identifying tag of claim 1, further including an RF amplitude limiter having a first terminal that is coupled to the voltage-charging rectifier circuit and a second terminal that is coupled to the resonator.

7. The battery-free circuit device for RF identifying tag of claim 6, further including a modulational switch which is coupled to the resonator at a first terminal and is coupled to ground at a second terminal, and wherein the on or off state of the modulational switch is determined by the signal process circuit.

8. The battery-free circuit device for RF identifying tag of claim 1, further including a modulational switch which is coupled to the resonator at a first terminal and is coupled to ground at a second terminal, and wherein the on or off state of the modulational switch is determined by the signal process circuit.

9. A battery-free circuit device for RF identifying tag, comprising:

a signal process circuit having an output, the signal process circuit providing time sequence modified signals;

a resonator that includes an antenna which resonates the signals received by the antenna, a voltage-charging rectifier circuit which is coupled to the resonator and is used to rectify the signals received by the antenna, a control computational circuit which is coupled to the voltage-charging rectifier circuit and the signal process circuit and is used to computationally control the modified wave form signals and is also used to control the operation of the battery-free circuit device for RF identifying tag, a frequency divider which is connected to the output of the signal process circuit and the control computational circuit and is used to divide the frequency of the time sequence modified signal, under the control of the control computational circuit, a shift register which is connected to the frequency divider and the control computational circuit and is used to register the signals that are then returned to the signal process circuit and finally emitted from the antenna, and an RF amplitude limiter having a first terminal that is coupled to the voltage-charging rectifier circuit, a second terminal that is coupled to the resonator, and an alternating amplitude limiter connected in parallel with a diode, and wherein the alternating amplitiude limiter uses a zener diode, and operates to limit alternating signals.

10. The battery-free circuit device for RF identifying tag of claim 9, wherein the resonator comprises an antenna connected in parallel with a capacitor to complete a resonating circuit which can resonate the signals.

11. The battery-free circuit device for RF identifying tag of claim 9, wherein the signal process circuit comprises a time sequence modifying circuit, wherein the input is also the input of the signal process circuit and is connected to one terminal of the resonator, and is used to amplify the RF signals received by the resonator which are then converted into time sequence modified signals with digital level and provide the time sequence modified signals for the entire system of the RF identifying tag, a demodulating circuit which is connected to one of the outputs of the time sequence modifying circuit and is used to demodulate the amplified and modified the RF signals received by the antenna and then deliver the signals into the control computational circuit, a modulating circuit which is connected to one of the outputs of the time sequence modifying circuit and the shift register and is used to modulate the signals that are going to be emitted, and the modulated signals are transmitted through the antenna of the resonator.

12. The battery-free circuit device for RF identifying tag of claim 9, wherein the control computational circuit comprises a control logic which has two inputs connected to the output of the signal process circuit and the output of the voltage-charging rectifier circuit respectively and receives the signals which have been received by the antenna and then amplified and modified to be digital signals of clock pulses and then demodulated and transmitted by the demodulating circuit, and is in charge of the operation of logic computation, in other words, controls the operation of the whole circuit device for RF identifying tag, a logic circuit for data storage which is connected to the control logic and is used to store the digital data which have been logically calculated, and is also connected to the shift register and is used to store the processed digital signals.

13. The battery-free circuit device for RF identifying tag of claim 9, further including a modulational switch which is coupled to the resonator at a first terminal and is coupled to ground at a second terminal, and wherein the on or off state of the modulational switch is determined by the signal process circuit.

14. The battery-free circuit device for RF identifying tag of claim 9, further including:

a capacitor that is coupled to ground;

a voltage limiter that is connected in parallel with the capacitor; and wherein the voltage-charging rectifier circuit includes two diodes, with the p-terminal of a first diode coupled to the n-terminal of a second diode, with the p-terminal of the second diode coupled to ground, and with the n-terminal of the first diode coupled coupled to the voltage limiter.

15. The battery-free circuit device for RF identifying tag of claim 14, wherein the voltage limiter utilizes a zener diode, and acts as a dc voltage limiter for the whole voltage-charging rectifier circuit.

* * * * *